(12) United States Patent
Schütz

(10) Patent No.: US 6,688,638 B2
(45) Date of Patent: Feb. 10, 2004

(54) VEHICLE STEERING WHEEL

(75) Inventor: Dominik Schütz, Waldaschaff (DE)

(73) Assignee: TRW Automotive Safety Systems GmbH & Co. KG, Aschaffenburg (DE)

( * ) Notice: Subject to any disclaimer, the term of this patent is extended or adjusted under 35 U.S.C. 154(b) by 100 days.

(21) Appl. No.: 09/976,828

(22) Filed: Oct. 12, 2001

(65) Prior Publication Data

US 2002/0043786 A1 Apr. 18, 2002

(30) Foreign Application Priority Data

Oct. 12, 2000 (DE) ..................... 200 17 527 U

(51) Int. Cl.[7] .............. B60R 21/16; H01H 9/00
(52) U.S. Cl. ............. 280/728.2; 280/731; 200/61.55
(58) Field of Search ................. 280/728.2, 731; 200/61.55, 61.56

(56) References Cited

U.S. PATENT DOCUMENTS

| | | | |
|---|---|---|---|
| 5,235,146 A | * | 8/1993 | Suzuki ............... 200/61.54 |
| 5,283,404 A | * | 2/1994 | Prescaro, Jr. ........ 200/61.54 |
| 5,327,796 A | * | 7/1994 | Ernst et al. ............. 74/484 H |
| 5,333,897 A | * | 8/1994 | Landis et al. .......... 280/728.2 |
| 5,350,190 A | | 9/1994 | Szigethy |
| 5,380,037 A | * | 1/1995 | Worrell et al. ........ 280/728.2 |
| 5,508,482 A | * | 4/1996 | Martin et al. ......... 200/61.55 |
| 5,765,860 A | * | 6/1998 | Osborn et al. ........ 280/728.2 |
| 5,775,725 A | | 7/1998 | Hodac et al. |
| 5,810,535 A | | 9/1998 | Fleckenstein et al. |
| 5,950,494 A | * | 9/1999 | Sugiyama ............... 74/484 H |
| 6,082,758 A | * | 7/2000 | Schenck ............... 280/728.2 |
| 6,086,090 A | * | 7/2000 | Fischer ................ 280/728.2 |
| 6,299,201 B1 | * | 10/2001 | Fujita .................. 280/731 |
| 6,312,012 B1 | * | 11/2001 | Bohn et al. ............. 280/731 |
| 6,474,682 B2 | * | 11/2002 | Ikeda et al. ............ 280/731 |
| 6,481,745 B2 | * | 11/2002 | Ford ..................... 280/731 |

FOREIGN PATENT DOCUMENTS

DE 4140275 A1 6/1992
DE 19503816 A1 8/1996

OTHER PUBLICATIONS

Research Disclosure for Steering Wheel Low Cost Ground for Floating Horn Mechanism, vol. 2244, p. 2039, Dec. 2000 XP-001052274, GB No. 440, Kenneth Mason Publications.

* cited by examiner

Primary Examiner—Paul N. Dickson
Assistant Examiner—Toan C To
(74) Attorney, Agent, or Firm—Tarolli, Sundheim, Covell & Tummino L.L.P.

(57) ABSTRACT

The invention relates to a vehicle steering wheel for a vehicle having a horn, said steering wheel having a longitudinal axis and comprising a gas bag module, a steering wheel skeleton, a gas bag module, at least one detent connection for connecting the gas bag module with the steering wheel skeleton. The gas bag module is displaceably mounted to the skeleton to allow a displacement of the gas bag module in the direction of the longitudinal axis to actuate the horn. The detent connection has first and second electrical contact surfaces, which come into contact with each other by displacement of the gas bag module to actuate the horn.

15 Claims, 6 Drawing Sheets

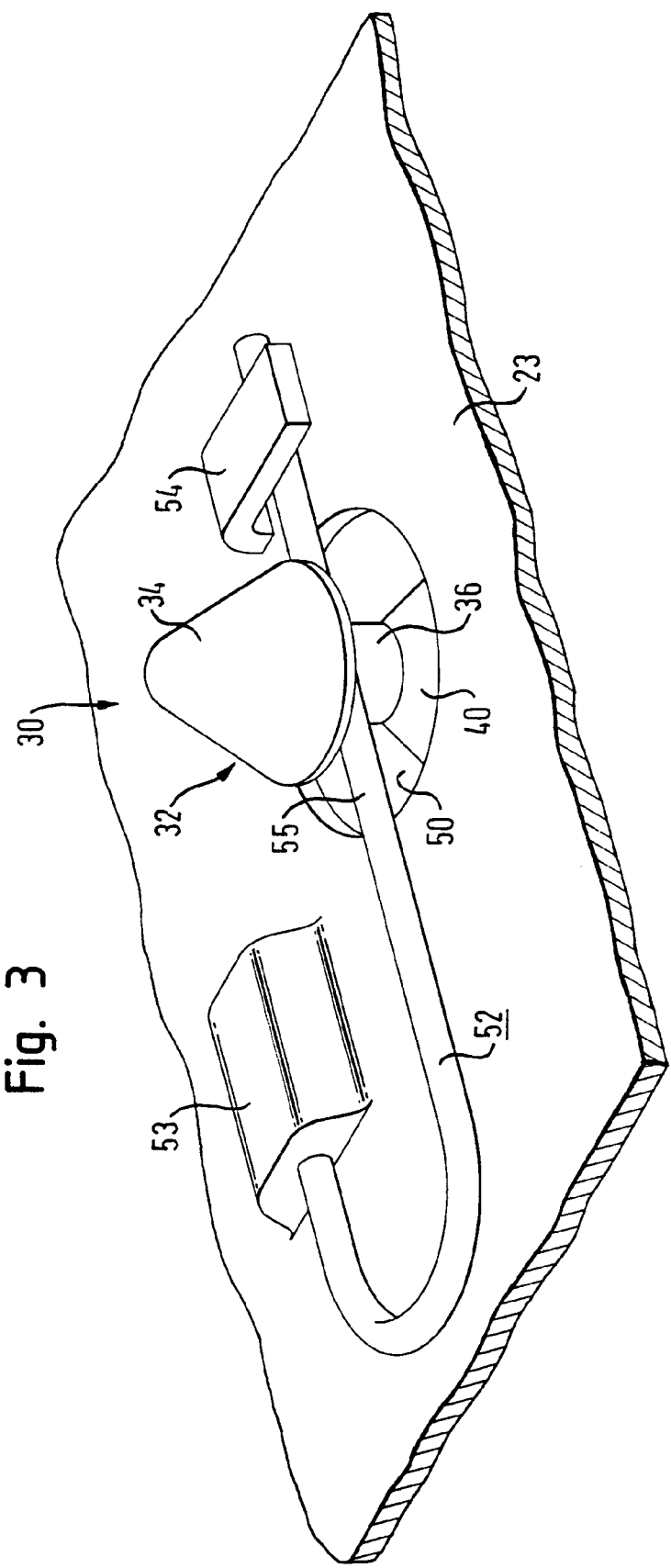

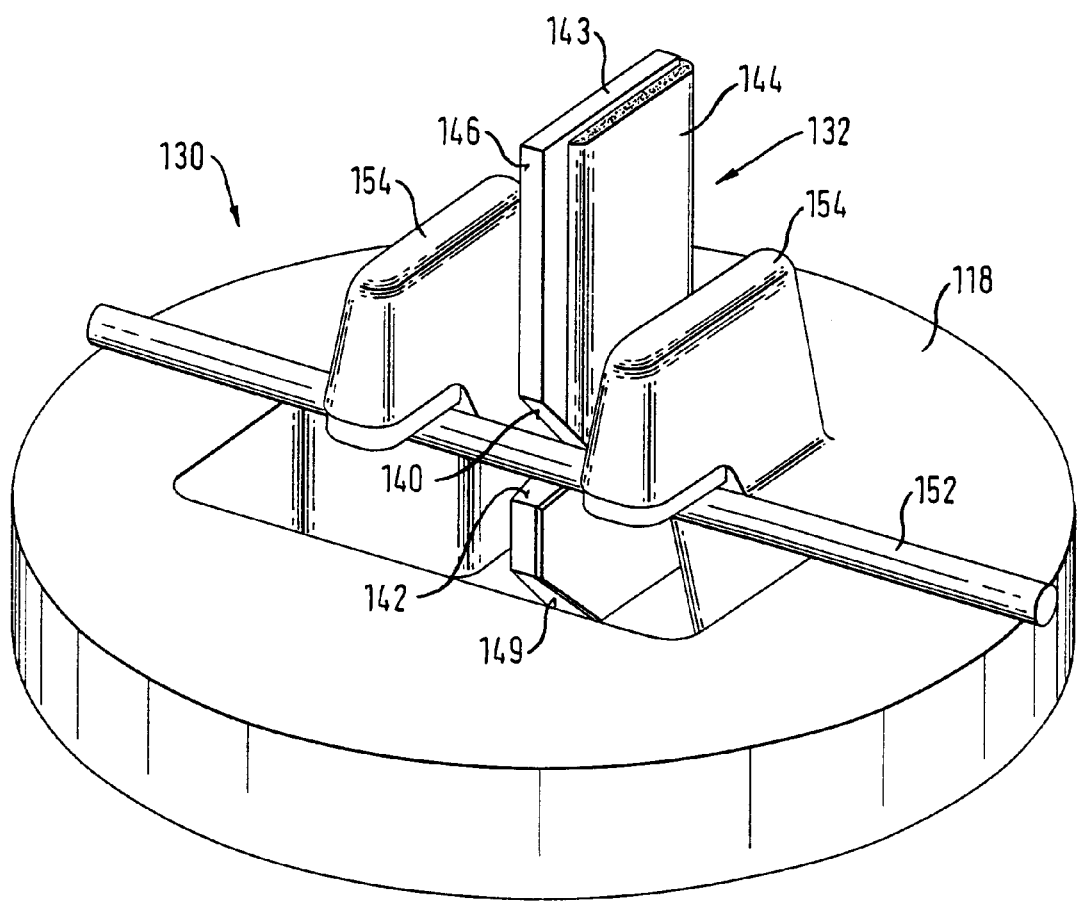

VEHICLE STEERING WHEEL

BACKGROUND OF THE INVENTION

In steering wheels, usually, a separate horn contact switch is provided between the gas bag module and the steering wheel skeleton, which switch is actuated on displacement of the gas bag module in the direction of the longitudinal axis. This horn contact switch is an additional component which has to be mounted as an extra component and hence entails additional costs in the production of the vehicle steering wheel. Furthermore, the separate horn contact switch takes up a portion of the already confined space in the vehicle steering wheel. A further disadvantage consists in that these switches generally cause noises on contacting.

BRIEF SUMMARY OF THE INVENTION

The invention is therefore based on the problem of providing a vehicle steering wheel with few components and a reduced installation expenditure. This is achieved in a vehicle steering wheel for a vehicle with a horn, said steering wheel having a longitudinal axis and comprising a gas bag module, a steering wheel skeleton, a gas bag module, at least one detent connection for connecting the gas bag module with the steering wheel skeleton. The gas bag module is displaceably mounted to the skeleton to allow a displacement of the gas bag module in the direction of the longitudinal axis to actuate the horn. The detent connection has first and second electrical contact surfaces, which come into contact with each other by displacement of the gas bag module to actuate the horn. In this way, the vehicle steering wheel is provided with a horn contact switch, without additional components being necessary.

According to an advantageous embodiment of the invention, provision is made that the detent connection has a detent element and a locking element, a first contact surface being constructed on the detent element and a second contact surface being constructed on the locking element. When the horn is actuated, the locking element lies with its second contact surface against the first contact surface, which is provided on the detent element. When the horn is not actuated, the locking element lies against a holding surface on the detent element, an electrical insulation being provided on the holding surface or on the locking element, which insulation when the horn is not actuated prevents an electrical contact between the locking element and the holding face and between the detent and locking elements, respectively. In this particularly simple development, the detent connection consists of merely two parts, which at the same time form the contact elements of the horn contact. The insulated holding surface on the detent element offers the possibility of using the detent element and the locking element as contacts and nevertheless, when the horn is not actuated, of bringing about via the two elements a mechanical connection between gas bag module and steering wheel skeleton.

Further developments of the invention and their advantages will be apparent from the sub-claims.

BRIEF DESCRIPTION OF THE DRAWINGS

FIG. 3 shows a perspective view of the detail II of the vehicle steering wheel of FIG. 1;

FIG. 5 shows the detent connection of FIG. 4 from a second perspective;

DETAILED DESCRIPTION OF THE PREFERRED EMBODIMENTS

Figure 1:
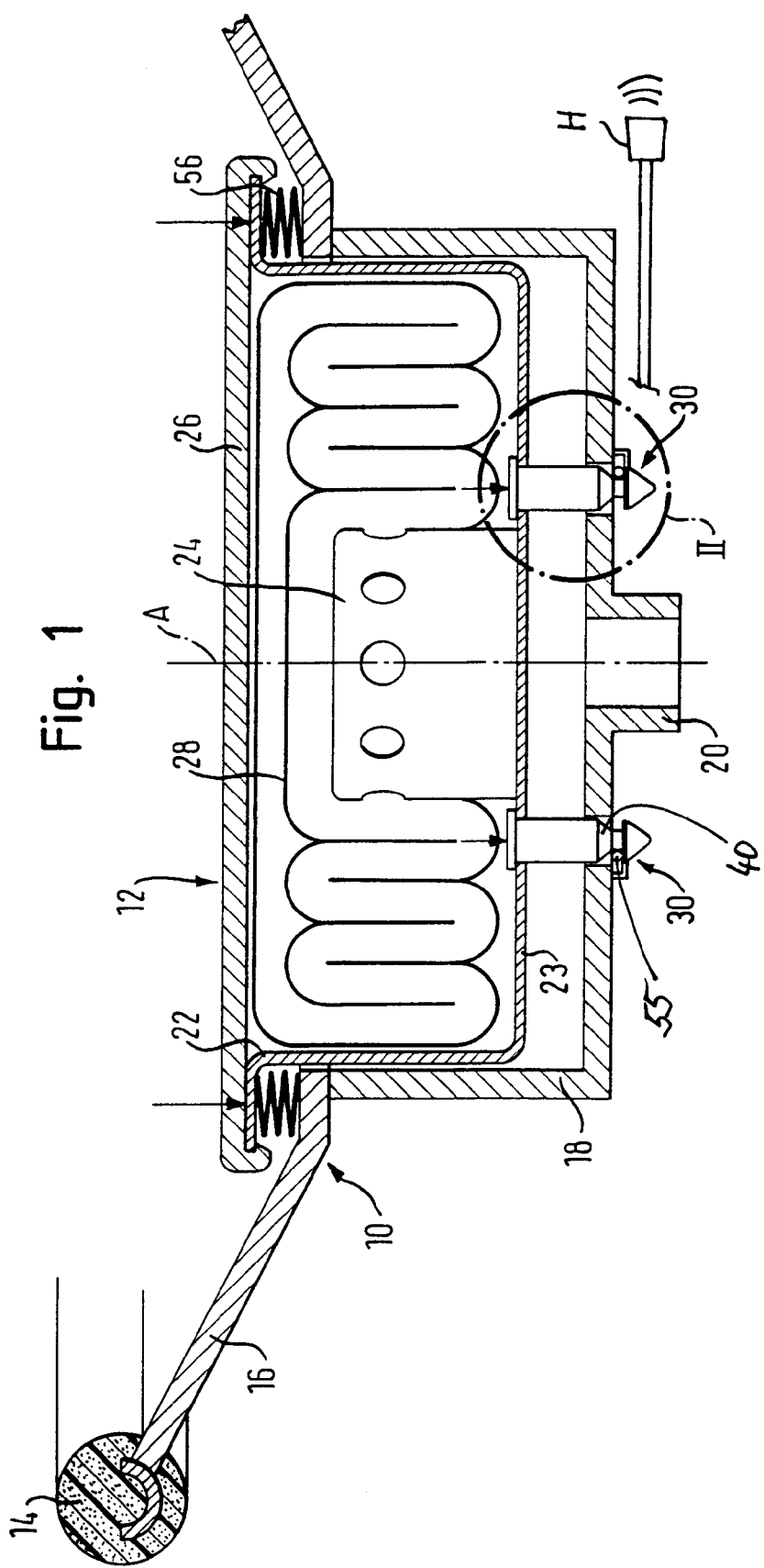
FIG. 1 shows a schematic cross-section through a first embodiment of a vehicle steering wheel according to the invention.

The vehicle steering wheel illustrated diagrammatically in FIG. 1 has a steering wheel skeleton 10 and a gas bag module 12. The longitudinal axis A of the steering wheel is illustrated by a dot-and-dash line. The steering wheel skeleton 10 has a steering wheel rim 14 encased in foam and connected via spokes 16 with a cup-shaped steering wheel hub 18. In the longitudinal axis A of the vehicle steering wheel, a sleeve 20 is provided on the hub 18 for fastening the steering wheel to a steering column in a conventional manner.

Figure 2B:
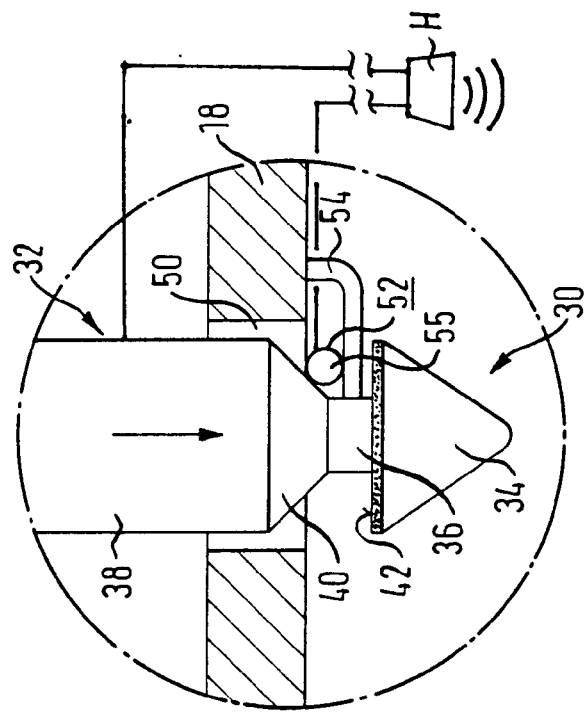
FIG. 2b shows a cross-section through the detail II of the vehicle steering wheel of FIG. 1 with the horn actuated.
Figure 2A:
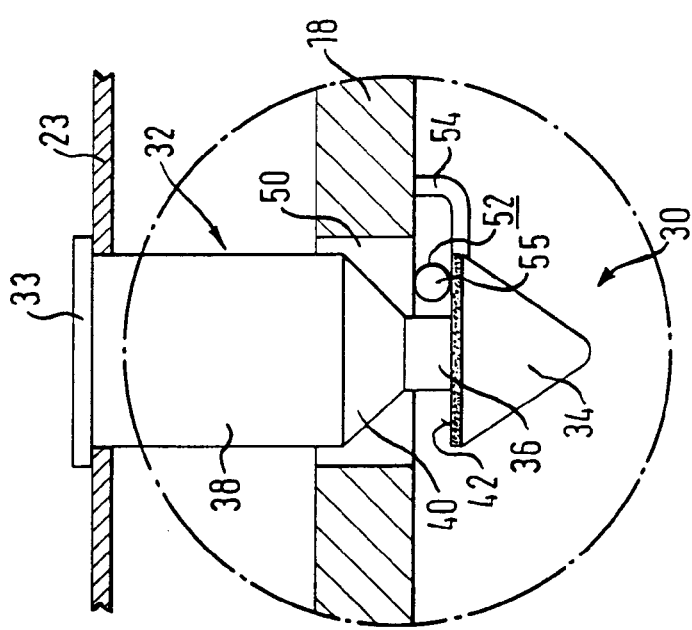
FIG. 2a shows an enlarged cross-section of the detail II of the vehicle steering wheel of FIG. 1 with the horn not actuated.

The gas bag module 12 is illustrated by way of example and has a cup-shaped module housing 22 with a base 23, which forms at the same time the support for a gas generator 24. The module housing 22 is closed towards the vehicle occupant side with a covering 26, which covers a folded gas bag 28 inside the module housing 22. The gas bag module 12 is connected by means of detent connections 30 with the hub 18, only two of which are to be seen in FIG. 1, which, however, are illustrated in greater detail in FIGS. 2a, 2b and 3.

Each of the detent connections 30 comprises a detent element in the form of a pin 32 with a cylindrical shaft 38 which is pressed by its foot end 33 into the base 23 of the module housing 22. At its head end, the pin 32 has a conical end section 34 to which a narrower intermediate section 36 adjoins. The transition from the intermediate section 36 to the cylindrical shaft 38 of the pin is formed by a section in the shape of a truncated cone, the envelope surface of which forms a first contact surface 40. On the rear face of the end section 34 a flat holding surface 42 is formed perpendicular to the longitudinal axis of the pin 32, which runs parallel to the longitudinal axis A. This holding surface 42 is electrically insulated from the pin 32, for example by a coating or a disc of insulating material which is placed on it.

As can best be seen from FIG. 3, an opening 50 is provided in the hub 18, through which the pin 32 can extend. On the underside of the hub, facing away from the gas bag module 12, there is a locking element in the form of a spring wire 52 as part of the detent element. The spring wire 52 is fastened to the hub 18, for example by its first end being pressed into an opening of a projection 53 on the underside of the hub. The second end of the spring wire 52 is able to be bent elastically parallel to the plane of the hub between the underside of the hub and a tongue 54 constructed thereon, the tongue 54 largely preventing a bending of the spring wire 52 parallel to the longitudinal axis A. The spring wire 52 extends eccentrically over the opening 50. Its surface forms a second contact surface 55 in the region of the opening 50.

Both contact surfaces 40, 55 are connected electrically in a conventional manner with the signal arrangements of the control apparatus for triggering the horn H, so that together they form a horn switch. When the pin 32 and the base 23 of the module housing 22 consist of metal, in an advantageous manner the contact surface 40 can lie on the mass potential of the vehicle, because the module housing 22 is generally connected in any case with the vehicle mass.

On installation of the gas bag module 12, the pin 32 is inserted through the opening 50, the frustum-shaped end section 34 bending the spring wire 52 elastically to the side, until the intermediate section 36 passes through the opening and the spring wire 52 can snap back again into its initial position. In this state, the spring wire 52 engages behind the end section 34, so that the pin 32 can no longer be drawn out from the opening 50, because the spring wire 52 lies against the holding surface 42.

Between the gas bag module 12 and the steering wheel skeleton 10, spring elements 56 are provided, which are illustrated in FIG. 1 as compression springs. The compression springs 56 exert a force on the gas bag module 12 so that the spring wire 52 lies free of play against the holding surface 42 when the horn is not actuated. With this, a basic position is established and the gas bag module 12 is prevented from rattling and causing disturbing noises whilst travelling.

To actuate the horn H, pressure is exerted by the vehicle occupant onto the gas bag module 12 contrary to the force of the springs 56 via the covering 26, so that the gas bag module 12 is displaced in the direction of the longitudinal axis A (see arrows in FIG. 1). Here, the pin 32 is also displaced with respect to the hub 18, until the first contact surface 40 comes into contact with the second contact surface 55 on the spring wire 52, whereby the horn contact is closed. In this way, the tolerance path of the detent connection, which is present in any case, is used as actuating path for the signal emission and hence space is saved with respect to solutions, in which the gas bag module is mounted so as to be displaceable separately. Through the fact that the first contact surface 40 on the pin 32 is inclined in relation to the displacement direction of the gas bag module 12, the spring wire 52 slides with contact on the contact surface 40. In this way, the electrical contact not only takes place at a single point, whereby the contact safety is increased; in addition, through the relative movement of the two contact surfaces 40, 55, a self-cleaning effect is produced and hence an increased lifespan of the horn contact. Advantageously, the two contact surfaces are provided with a conductive coating, are for instance galvanically silver-plated, in order to reduce the transition resistance and to reduce the risk of corrosion.

Of course, various modifications are conceivable for the construction of the contact surfaces. The pin 32, for example, can be metallic as shown and can have an insulation on the holding surface 42. Alternatively, it would also be conceivable to construct the pin 32 in plastic and to provide the contact surface 40 with a metallization. This would be particularly advantageous if the module housing 22 likewise consists of plastic, so that the pin 32 can also be molded on in one operating step.

Furthermore, the pin 32 can alternatively also be arranged on the hub 18 and the opening 50 and the spring wire 52 can be provided on the gas bag module 12, so that the detent connection is arranged in reverse.

A particularly simple embodiment is produced when the pin 32 and the openings 50 lie on a circular line around the longitudinal axis A, because in this case a ring-shaped spring wire, which is guided by means of tongues 54, can be used as single locking element for all detent connections.

Figure 4:
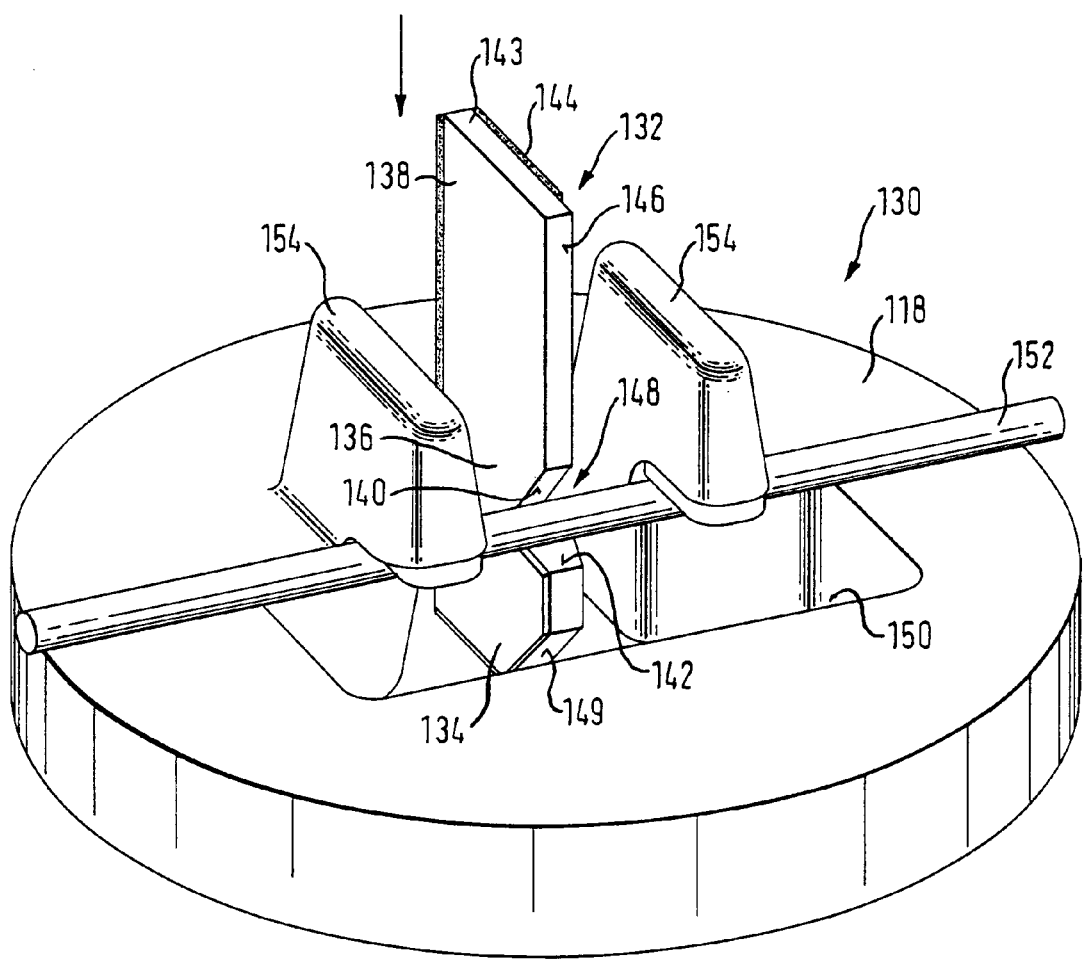
FIG. 4 shows a detent connection of a vehicle steering wheel according to a second embodiment of the invention from a first perspective.

In FIGS. 4 and 5 a further embodiment of a detent connection 130 is illustrated for a vehicle steering wheel according to the invention, reference numbers being used, increased by 100, for components which are already known. In this embodiment, a detent hook 132 is provided as detent element, which consists of a contact body 143 and an insulation 144. The contact body 143 is formed by a flat metal strip which can be produced for example by punching out and subsequent bending off from the base of the module housing and has an electrically insulating material injected around it, which forms the insulation 144. In FIG. 4 on the left-hand side the insulation 144 is cut open, to show clearly the metallic contact body. As can be seen, the contact body has a shaft 138 and an end section 134, which is connected via a narrower intermediate section 136 with the shaft 138.

Owing to the narrower intermediate section 136, the contact body has on a narrow side, which is designated hereinbelow as the contact side 146, a recess 148, the side of which adjoining the end section 134 runs at right angles to the longitudinal axis of the detent hook 132, so that on the rear face of the end section 134 a holding surface 142 is formed perpendicular to the direction of displacement (arrow in FIG. 4). The edge 149 between the free end of the end section 134 and the contact side 146 is chamfered. The side of the recess 148 adjoining the shaft 138 is inclined in relation to the direction of displacement and represents a first contact surface 140. The insulation 144 almost completely surrounds the contact body; only a region around the contact side 146 of the shaft 138 and in particular the first contact surface 140 are kept free. As locking element in turn a spring wire 153 is provided which, as already described, can be fastened to the hub 118. At the edge of the opening 150 two tongues 154 are formed, which guide the spring wire 152 parallel to the plane of the hub 118. The detent hook 132 engages into an opening 150 in the hub 118.

On insertion of the detent hook 132, the spring wire 152 is bent to one side by the chamfered edge 149 on the end section 134 of the detent hook, until the detent hook 132 is plunged so far into the opening 150 that the spring wire 152 can snap into the recess 148. Thereby, the detent hook 132 is secured against being pulled out by the spring wire 152 resting against the holding surface 142. As already described in the first embodiment, the holding surface 142 is held by compression springs between gas bag module and steering wheel skeleton in abutment against the spring wire 152.

Through the extensive insulation of the detent hook 132, an additional guidance of the detent hook in the opening 150 to avoid short-circuits between detent hook 132 and hub 118 is not necessary.

This embodiment also offers the possibility of various construction variants. Thus it would be conceivable to construct the detent hook with a contact body of metal, as illustrated in FIGS. 4 and 5, however without an insulating injection-molded casing, and instead to arrange alongside it and in parallel an insulating body of identical or similar design from an electrically insulating material, which is partially staggered in the displacement direction, so that with a displacement of the detent hook a contact of the spring wire with the first contact surface is permitted, however is prevented with the holding surface of the contact body.

Figure 7:
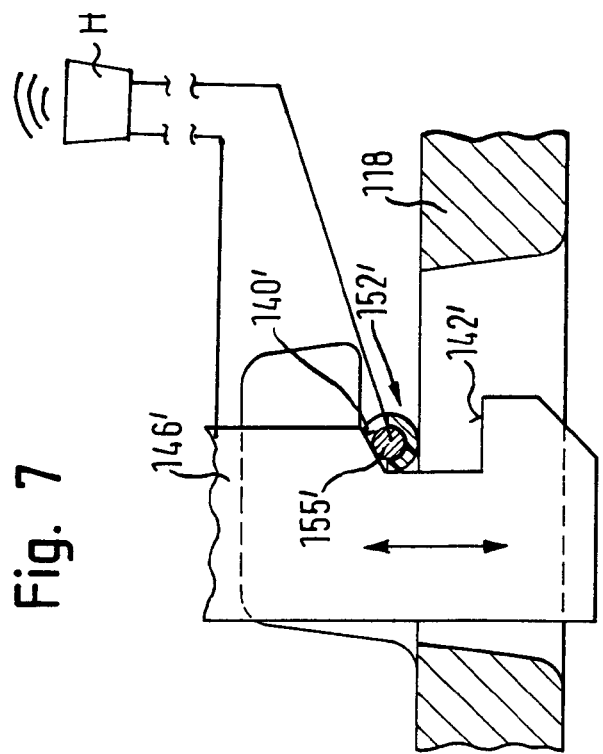
FIG. 7 shows a cross-section through the detent connection of FIG. 6 with actuated horn.
Figure 6:
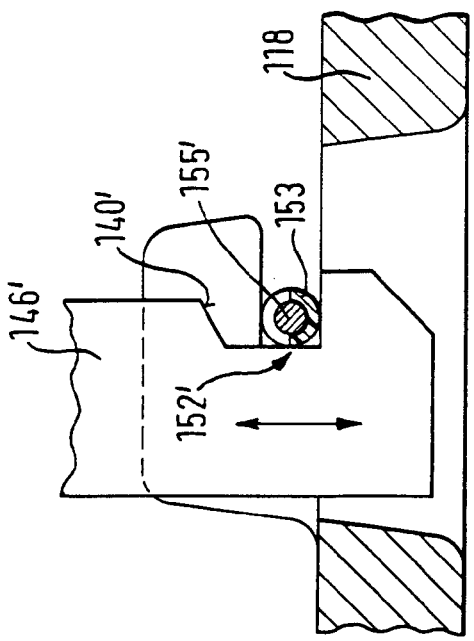
FIG. 6 shows a cross-section through a detent connection of a vehicle steering wheel according to a third embodiment of the invention with non-actuated horn.

Advantageously, as an alternative, instead of the detent hook 146', the spring wire 152' can be provided with an insulation 153, which is recessed in the region of the contact surface 155' which lies opposite the first contact surface 140', as is illustrated in a variant in FIGS. 6 and 7. This embodiment offers advantages in terms of manufacturing technique, because the detent hook is generally connected electrically with the generator housing and therefore carries earth potential, whereas the spring wire in any case has to be insulated against earth. In addition, the insulation of the spring wire is easier to produce. The holding surface is designated by 142', against which the insulation 154 lies in FIG. 6.

A further variant consists in using a substantially solid wire for the locking element, instead of a spring wire, and instead in constructing the detent hook so elastically that it can be pushed aside on insertion into the opening by sliding along the chamfered edge of the end section on the locking element, until the recess snaps in behind the locking element. This can take place for instance in that the detent hook in itself is elastic perpendicular to the displacement direction. Another possibility would be to construct the detent hook so as to be pivoting perpendicular to the displacement direction and to act upon it elastically by means of a spring.

What is claimed is:

1. A vehicle steering wheel for a vehicle having a horn, said steering wheel having a longitudinal axis and comprising:
    a gas bag module,
    a steering wheel skeleton,
    at least one detent connection for connecting said gas bag module with said steering wheel skeleton,
    said gas bag module being displaceably mounted to said skeleton to allow a displacement of said gas bag module in the direction of said longitudinal axis to actuate said horn,
    said detent connection having first and second electrical contact surfaces which come into contact with each other by displacement of the gas bag module to actuate said horn,
    said detent connection having a detent element and a locking element,
    said first contact surface being provide on said detent element,
    said second contact surface being provided on said locking element,
    said locking element, when said horn is actuated, lying with said second contact surface against said first contact surface, and said locking element, when said horn is not actuated, lying against a holding surface on said detent element,
    an electrical insulation being provided on one of said holding surface and said locking element, and
    said electrical insulation, when said horn is not actuated, preventing an electrical contact between said locking element and said holding surface and between said detent and locking elements, respectively.

2. The vehicle steering wheel according to claim 1, wherein said detent element has an end section and a narrower intermediate section adjoining thereto, a rear face of said end section forming said holding surface and said locking element engaging behind said end section on said rear face.

3. The vehicle steering wheel according to claim 2, wherein said detent element is a detent hook.

4. The vehicle steering wheel according to claim 3, wherein a spring element is provided which holds said locking element free of play in abutment against said holding surface when said horn is not actuated.

5. The vehicle steering wheel according to claim 1, wherein said detent element has a contact body of metal and an insulation of an electrically insulating material, which insulation electrically insulates at least said holding surface.

6. The vehicle steering wheel according to claim 5, wherein said detent element consists of metal and has an electrically insulating layer injected partially around it.

7. The vehicle steering wheel according to claim 1, wherein said locking element consists of metal and is partially provided with an electrically insulting layer.

8. The vehicle steering wheel according to claim 1, wherein one of said two contact surfaces is inclined in relation to said displacement direction of said gas bag module and wherein one of said detent and locking elements is constructed to be elastic that said first and second contact surfaces slide on each other on contact.

9. The vehicle steering wheel according to claim 1, wherein said locking element is a spring wire.

10. The vehicle steering wheel according to claim 1, wherein said first and second contact surfaces are provided with an electrically conductive coating.

11. A vehicle steering wheel for a vehicle having a horn, said steering wheel having a longitudinal axis and comprising:
    a gas bag module,
    a steering wheel skeleton,
    at least one detent connection for connecting said gas bag module with said steering wheel skeleton,
    said gas bag module being displaceably mounted to said skeleton to allow a displacement of said gas bag module in the direction of said longitudinal axis to actuate said horn,
    said detent connection having first and second electrical contact surfaces which come into contact with each other by displacement of the gas bag module to actuate said horn,
    said detent connection having a detent element and a locking element,
    one of said two contact surfaces being inclined in relation to said displacement direction of said gas bag module, and
    one of said detent and locking elements being constructed to be elastic that said first and second contact surfaces slide on each other on contact.

12. A vehicle steering wheel for a vehicle having a horn, said steering wheel having a longitudinal axis and comprising:
    a gas bag module,
    a steering wheel skeleton,
    at least one detent connection for connecting said gas bag module with said steering wheel skeleton,
    said gas bag module being displaceably mounted to said skeleton to allow a displacement of said gas bag module in the direction of said longitudinal axis to actuate said horn,
    said detent connection having first and second electrical contact surfaces which come into contact with each other by displacement of the gas bag module to actuate said horn,
    said detent connection having a detent element and a locking element,
    said first contact surface being provide on said detent element, and said second contact surface being provided on said locking element.

13. A vehicle steering wheel for a vehicle having a horn, said steering wheel having a longitudinal axis and comprising:
- a gas bag module,
- a steering wheel skeleton,
- at least one detent connection for connecting said gas bag module with said steering wheel skeleton,
- said gas bag module being displaceably mounted to said skeleton to allow a displacement of said gas bag module in the direction of said longitudinal axis to actuate said horn,
- said detent connection having first and second electrical contact surfaces which come into contact with each other by displacement of the gas bag module to actuate said horn,
- said detent connection having a detent element and a locking element,
- said detent element having a holding surface abutting against said locking element, when said horn is not actuated, and
- said detent element having a contact body of metal and an insulation of an electrically insulating material, which insulation electrically insulates at least said holding surface.

14. The vehicle steering wheel according to claim 13, wherein said detent element consists of metal and has an electrically insulating layer injected partially around it.

15. A vehicle steering wheel for a vehicle having a horn, said steering wheel having a longitudinal axis and comprising:
- a gas bag module,
- a steering wheel skeleton,
- at least one detent connection for connecting said gas bag module with said steering wheel skeleton,
- said gas bag module being displaceably mounted to said skeleton to allow a displacement of said gas bag module in the direction of said longitudinal axis to actuate said horn,
- said detent connection having first and second electrical contact surfaces which come into contact with each other by displacement of the gas bag module to actuate said horn,
- said detent connection having a detent element and a locking element,
- said detent element having a holding surface,
- said locking element consisting of metal and being partially provided with an electrically insulating layer, and
- said insulating layer lying against said holding surface when said horn is not actuated.

* * * * *